US008700543B2

(12) United States Patent
Glickman

(10) Patent No.: US 8,700,543 B2
(45) Date of Patent: Apr. 15, 2014

(54) WEB PAGE ANALYSIS SYSTEM FOR COMPUTERIZED DERIVATION OF WEBPAGE AUDIENCE CHARACTERISTICS

(75) Inventor: Oren Glickman, Moshav Zofit (IL)

(73) Assignee: Red Contexto Ltd., Tel Aviv (IL)

( * ) Notice: Subject to any disclaimer, the term of this patent is extended or adjusted under 35 U.S.C. 154(b) by 256 days.

(21) Appl. No.: 13/113,575

(22) Filed: May 23, 2011

(65) Prior Publication Data
US 2012/0209795 A1  Aug. 16, 2012

Related U.S. Application Data

(60) Provisional application No. 61/442,214, filed on Feb. 12, 2011.

(51) Int. Cl.
*G06F 15/18* (2006.01)

(52) U.S. Cl.
USPC ............................................................. 706/12

(58) Field of Classification Search
USPC ........................................................ 706/12, 62
See application file for complete search history.

(56) References Cited

U.S. PATENT DOCUMENTS

| | | | |
|---|---|---|---|
| 2001/0021935 A1* | 9/2001 | Mills | 707/513 |
| 2003/0101024 A1* | 5/2003 | Adar et al. | 702/187 |
| 2007/0208728 A1* | 9/2007 | Zhang et al. | 707/5 |
| 2008/0065471 A1* | 3/2008 | Reynolds et al. | 705/10 |
| 2008/0201633 A1* | 8/2008 | Huang et al. | 715/239 |
| 2008/0215607 A1* | 9/2008 | Kaushansky et al. | 707/102 |
| 2009/0287694 A1* | 11/2009 | McGowan et al. | 707/5 |
| 2010/0042612 A1* | 2/2010 | Gomaa | 707/5 |
| 2010/0119053 A1* | 5/2010 | Goeldi | 379/265.09 |
| 2010/0121843 A1* | 5/2010 | Goeldi | 707/722 |
| 2010/0121849 A1* | 5/2010 | Goeldi | 707/736 |
| 2010/0153175 A1* | 6/2010 | Pearson et al. | 705/10 |
| 2010/0161385 A1* | 6/2010 | Karypis et al. | 705/10 |
| 2010/0223215 A1 | 9/2010 | Karypis et al. | |

OTHER PUBLICATIONS

De Bock et al, "Predicting web site audience demographics for web advertising targeting using multi-web site clickstream data", Ghent University, Faculty of Economics and Business Administration, Department of Marketing, Tweekerkenstraat 2, B-9000 Ghent, Belgium, Nov. 2009.*

D. Murray and K. Durrell, "Inferring demographic attributes of anonymous Internet users", Proc.International Workshop on Web Usage Analysis and User Profiling (B. Masand and M. Spiliopoulou, Ed.), LNCS 1836, 2000.*

Hu et al, "Demographic Prediction Based on User's Browsing Behavior", WWW 2007, May 8-12, 2007, Banff, Alberta, Canada.*

(Continued)

*Primary Examiner* — Jeffrey A Gaffin
*Assistant Examiner* — Ilya Traktovenko
(74) *Attorney, Agent, or Firm* — Oliff PLC

(57) ABSTRACT

A system for generating a demographic profile for a set of at least one webpage, the system comprising a webpage audience information gatherer operative for providing, for at least one webpage, training data including demographic information characterizing an audience of the webpage; a predictor developing system operative to compute at least one content characteristic of said webpage and to develop a prediction process which if applied to said content characteristic would have predicted said training data; and a webpage audience predictor operative, for at least one new webpage, whose audience is unknown, to compute at least one content characteristic of the new webpage and to generate predicted demographic information predicted to characterize said unknown audience of said new webpage by applying said prediction process to said new webpage's content characteristic.

45 Claims, 13 Drawing Sheets

(56) References Cited

OTHER PUBLICATIONS

"Demographics," *Wikipedia*, http://en.wikipedia.org/wiki/Demographics, May 17, 2011.
"Behavioral targeting," *Wikipedia*, http://en.wikipedia.org/wiki/Behavioral_targeting, May 19, 2011.
"HTTP cookie," *Wikipedia*, http://en.wikipedia.org/wiki/HTTP_cookie, May 21, 2011.
Koppel et al., "Automatically categorizing written texts by author gender," *In Literary and Linguistic Computing*, 2003.
Mulac et al., "The gender-linked language effect in primary and secondary students' impromptu essays," *Sex Roles*, pp. 439-469, vol. 23, Nos. 9/10, 1990.
Schler et al., "Effects of age and gender on blogging," *American Association for Artificial Intelligence*, 2006.
Hu et al., "Demographic prediction based on user's browsing behavior," *International World Wide Web Conference Committee*, pp. 151-160, 2007.
Levering et al., "Visual features in genre classification of HTML," *Proceedings of the eighteenth conference on Hypertext and hypermedia*, pp. 51-52, 2007.

\* cited by examiner

510: Classification system 80 receives input of URL:
"http://inventor.blogspot.com/2011/02/demographic-prediction.html"

↓

520: Content Fetcher 40 fetches URL content:
"<html>
<head><title> METHOD AND SYSTEM CONFIGURED TO CONTEXTUALLY INFER AUDIENCE CHARACTARISTICS FOR WEB PAGES </title></head>
<body>Knowledge of user demographics is extremely important for the website owner to better understand its customers and tailor its user experience accordingly.
<body>
</html>"

↓

530: Pass content to feature extractor 50. Obtain following weighted features for content item:
TextToken_demographics:0.8, TextToken_knowledge:0.6, ,
TextToken_website:0.4, TextLength:22, AdjectiveFrequency:0.1,
AvgSentencesPerParagraph:1, HasImage:0, BackGroundColor_white:1,
AverageWordsPerSentence:22, SlangUsage:0, TextTopic_www:0.3,
TextTopic_legal:0.2, FontSize_12:1, ...

↓

540: classification process 80 Runs classification model (from storage unit 60) over content weighted features to obtain demographic characteristic predictions:
Gender: Male
AgeGroup: 35-45
Education: Grad School
AnnualIncome: $100K+

610: Learning unit 20 receives training input from data repository 10:
"http://howtodo.la/how-to-trim-your-beard.html" -- Gender:Male
"http://cosmupulitan.com/ best-hairstyles-oscars.html" -- Gender:Female

---

620: Content Fetcher 40 fetches URL content:
A. http://howtodo.la/how-to-trim-your-beard.html
"<html>
<head><title> How to trim your beard </title></head>
<body> Buy a beard trimmer and shave until beard is trimmed.<body>
</html>"
B. http://cosmupulitan.com/ best-hairstyles-oscars.html
"<html>
<head><title>Hairstyle Stars at the 2011 Oscars</title></head>
<body bgcolor="EE82EE" >As the night's hostess, Annie Hathawire heroically endured eight costume changes over the course of the night.<body>

---

630: Pass each individual content example to feature extraction unit 50 to obtain the representative features of each training content item:
A. http://howtodo.la/how-to-trim-your-beard.html
TextToken_trim:0.8, TextToken_beard:0.6, TextToken_shave:0.4, TextLength:10, AdjectiveFrequency:0.05, AvgSentencesPerParagraph:1, HasImage:0, BackGroundColor_white:1, AverageWordsPerSentence:10, SlangUsage:0, FontSize_12:1, ...
B. http://cosmupulitan.com/ best-hairstyles-oscars.html
TextToken_hostess:0.7, TextToken_heroically:0.9, TextToken_costume:0.3, TextLength:17, AdjectiveFrequency:0.06, AvgSentencesPerParagraph:1, HasImage:0, BackGroundColor_violet:1, AverageWordsPerSentence:17, SlangUsage:0, FontSize_12:1, ...

---

640: Pass content items represented as features along with corresponding target demographic characteristics to supervised learning algorithm to obtain a prediction model:
Gender model file
Gender:Male: TextToken_trim:0.1, TextToken_beard:1.2, TextToken_shave:0.9,...
Gender:Female: TextToken_hostess:1.7, TextToken_heroically:2.1, TextToken_costume:3.2, BackGroundColor_violet:1.9,...

URL for Classification:

1010 | http://www.usatoday.com/sports/basketball/nba.2012 |

Send URL>>

1020  Or Insert Text for Classification:

Celtics top Magic as Marquis Daniels leaves on
Stretcher - USATODAY.com.
Celtics top Magic as Marquis Daniels leaves on
Stretcher - USATODAY.com.
Celtics top Magic as Marquis Daniels leaves on Send Text >>

1030  Gender:

Male                          79.1%
Female                    20.8%

Age Group:

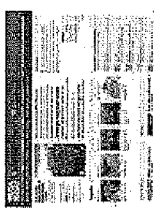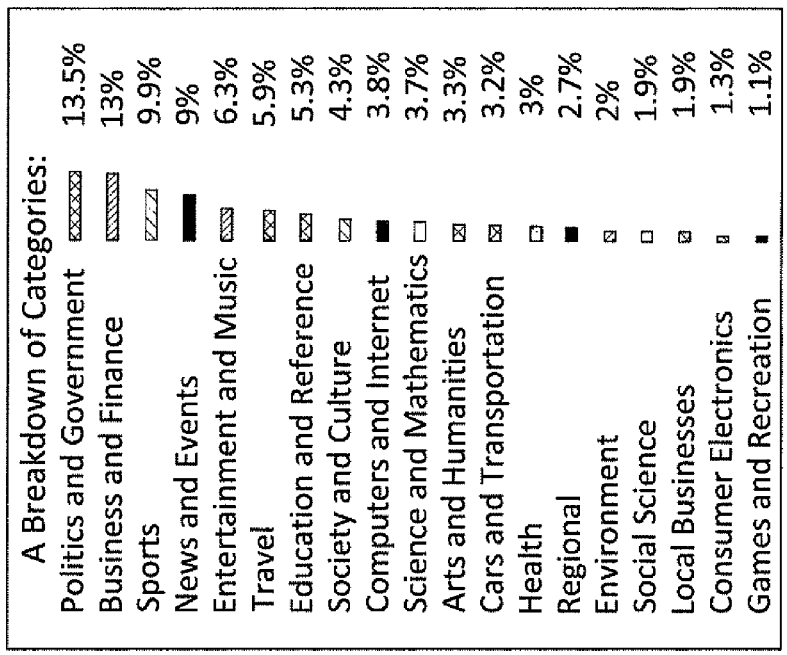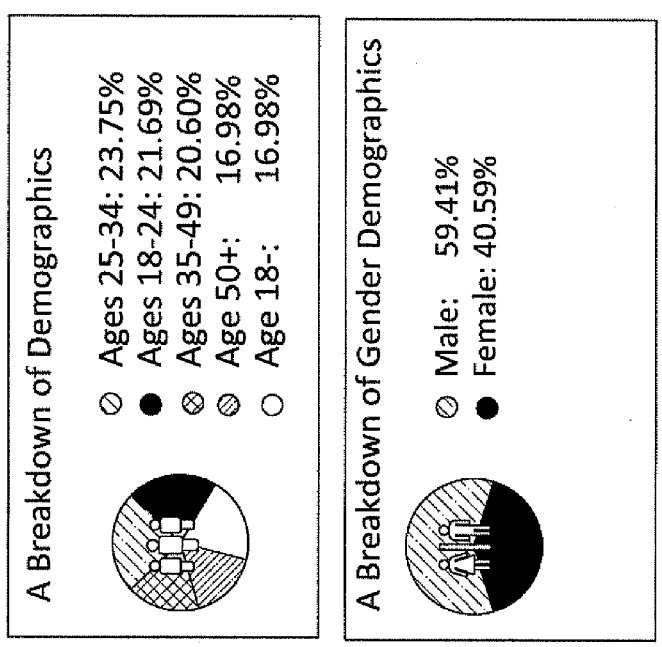
Fig. 11

WEB PAGE ANALYSIS SYSTEM FOR COMPUTERIZED DERIVATION OF WEBPAGE AUDIENCE CHARACTERISTICS

REFERENCE TO CO-PENDING APPLICATIONS

Priority is claimed from U.S. provisional application No. 61/442,214, entitled "Method And System Configured To Contextually Infer Audience Characteristics For Web Pages" and filed on 12 Feb. 2011.

FIELD OF THE INVENTION

The present invention relates generally to webpage management and more particularly to generating a demographic profile of surfers.

BACKGROUND OF THE INVENTION

Conventional technology pertaining to certain embodiments of the present invention is described in the following publications inter alia:
1. Wikipedia article on Demographics
2. Wikipedia article on Behavioral targeting
3. Wikipedia article on HTTP_cookie
4. M. Koppel, S. Argamon and A. R. Shimoni (2003): *Automatically Categorizing Written Texts by Author Gender*. In Literary and Linguistic Computing, 2003.
5. Mulac, A., L. B. Studley, S. Blau (1990). *The gender-linked language effect in primary and secondary students' impromptu essays*, Sex Roles 23, 9/10, 1990.
6. M. Koppel, J. Schler, S. Argamon, and J. W. Pennebaker. *Effects of age and gender on blogging*. In AAAI 2006 Spring Symposium on Computational Approaches to Analysing Weblogs, 2006.
7. Jian Hu, Hua-Jun Zeng, Hua Li, Cheng Niu, and Zheng Chen. 2007. *Demographic prediction based on user's browsing behavior*. In Proceedings of the 16th international conference on World Wide Web (WWW '07). ACM, New York, N.Y., USA, 151-160.
8. US 2010223215 (A1) to Kypris & Han
9. Ryan Levering, Michal Cutler, Lei Yu. *Visual features in genre classification of html*. In HT '07: Proceedings of the eighteenth conference on Hypertext and hypermedia (2007), pp. 51-52.

Peer39 provide software tools for computerized distribution and accumulation of web "real-estate" and semantic-based design of campaigns for targeted content provision including semantic category classification software.

ContextIn provide a semantic technology platform useful for computerized distribution and accumulation of web "real-estate".

The disclosures of all publications and patent documents mentioned in the specification, and of the publications and patent documents cited therein directly or indirectly, are hereby incorporated by reference.

SUMMARY OF EMBODIMENTS OF THE INVENTION

Billions of web pages are viewed by users on the Internet daily. Every such page view is associated with a specific page and user. The pages (commonly identified by a Unified Resource Locator) contain HTML content served to an individual web user. Each such individual user has associated demographic characteristics such as but not limited to age, gender, occupation, and education level.

Knowledge of user demographics is extremely important for the website owner to better understand his customers and to tailor user experience accordingly. Knowledge of demographics is the key aspect of any user-targeted computerized action. Demographics also facilitate provision of targeted content to users and behavioral targeting. Behavioral targeting using demographic characteristics enables targeting of specific users (typically users belonging to a group, e.g. webpage or site audience, with particular characteristics) and providing an automatically selectable computerized experience to those users, such as but not limited to presenting such users with appropriate textual or audio-visual content, games, links, computerized management of digital advertisements and suitable combinations of these digitally implemented experiences.

A Supply Side Platform, or SSP, may include a technology platform which represents the suppliers of online digital experiences, and/or guarantees inventory availability. This allows many of the larger web publishers of the world to use an SSP to automate distribution of their online media space.

A demand side platform (DSP) may include a system that facilitates management of multiple data exchange accounts through one computerized interface integrated over more than one computerized negotiating entity. Real time bidding may take place within the exchanges, and by utilizing a DSP, bids can be managed so as to best target audiences with data. A DSP typically allows for transparent automated computerized transactions for media space, across multiple sources using, typically, one or more of unified targeting, data, optimization and reporting.

Obtaining an overall distribution of a website's audience is commonly obtained by the site by leveraging information known for a sample of users. Users with known demographics can be obtained in various ways—users prompted by surveys who state their demographic information, or registered users who fill in demographic information during the registration process. This type of information is not always available nor is it easily collected, and in either case, if available, is private information available solely to a site owner.

Another source of demographic information is via $3^{rd}$ party companies who maintain a panel of web users with known demographic information for which they track their online activity, thereby to obtain an estimate of the overall distribution of a website's audience when sufficient click-stream data is available for a given site. Nielson Online, Which has a web presence at:
 en-us.nielsen.com/tab/product_families/nielsen_netratings,
Alexa, which has a web presence at alexa.com/topsites, Quantcast, which has a web presence at quantcast.com and Comscore, which has a web presence at comscore.com, are examples of computerized entities providing such a service. Such methods of obtaining demographic information are limited to overall statistics over the website sub-domain and can rarely provide information at a page level. This is due to the reliance on sufficient online activity while tracking or having information available on a small sample of users. For pages with a short life expectancy (e.g. news articles), by the time such systems could obtain any significant demographic statistics the page would probably be outdated and the information of less value. In any case, methods which rely on monitoring actual user usage cannot supply any insight on a new page which was has not yet been visited by any user.

Due to the combination of the above factors, and other factors, the methods in use today for characterizing the audience characteristics of websites are limited in their accuracy, their ability to provide information at a page level or webpages that do not attract substantial audience traffic, and their failure to protect users' rights to information privacy.

Certain embodiments of the present invention use contextual techniques to infer behavioral characteristics. Contextual techniques are computerized methods which use a processor to analyze page content (e.g. the words in the text appearing in a page) e.g. to infer the main topics of the page. For example, contextual advertising systems scan the text of a website for keywords and display advertisements to the webpage based on what the user is viewing. For example, if the user is viewing a website pertaining to sports and that website uses contextual advertising, the user may see advertisements for sports-related companies, such as memorabilia dealers or ticket sellers. While behavioral systems focus on the user (regardless of the page they are currently viewing), contextual systems relate only to the current page the user is viewing. For example, in a behavioral advertising system, if a user is known to be a sports enthusiast, the system may display a sports related advertisement even if he is currently viewing a political news article.

In recent years, various academic works have categorized text based on the author's demographic characteristics. For example, Koppel et al, (reference 4 above) present a method to predict the author's gender based on the author's writing. In another work, Koppel et al. (reference 5 above), bloggers' writing styles are used to predict their actual gender and age information. These works focus on inferring the author's demographics and not that of the actual audiences consuming the author's content.

Contextual methods have the advantage of no privacy issues, and are able to provide information at a page level even if there is no usage information. In addition, contextual methods rely only on the available content of the page and do require access to a site-user base or clickstream data. However, existing contextual systems methods such as described above focus on semantic and stylistic inference on the page content or on inferring information on the author.

Described herein is a method to infer/predict the (expected) audience of a given page based on its content of the page by applying an inference engine which is trained on a training set of usage data for users with known demographic characteristics. The method typically includes learning correlations between features of webpage content and applying predictive models/classification algorithms to predict the actual or forthcoming page audience. Web content features typically include one, some or all of content words in page textual content, stylistic writing features (e.g. frequency of use of certain parts of speech such as but not limited to all or certain personal pronouns in text, or average sentence length) and/or html specific features (bold, color, images, etc.). Learning relies on a given training dataset of content web pages (along with their content) associated with the demographics of a specific user who visited or engaged with the content.

Certain embodiments of the present invention seek to provide a method and system configured to predict the audience of a web content page based on analysis of characteristics of at least one webpage e.g. webpage content. Content of a webpage refers e.g. to html content which the webserver returned when an http request was made to a server with a URL (or URI), e.g. as may be seen from the user's browser when the user does a view source on a page s/he is viewing. Typically, the prediction is based (inter alia) on the webpage (e.g. on what the webpage suggests about its target audience, based on accumulated data on past relationships between webpage characteristics and resulting audience characteristics, and is not based (solely) on information directly obtained regarding the audience or any specific user therein.

According to an embodiment of the present invention, the data being related to each content item includes HTML content of the page. Other embodiments may analyze other content types such as pdf files. Certain embodiments of the present invention seek to provide a computerized system for distribution and/or accumulation of web "real-estate" based on demographic categorization (e.g. Gender=Male or Age-Group=45-60) rather than or in addition to semantic categorization (e.g. Sport or Technology).

There is thus provided, in accordance with at least one aspect of the presently disclosed subject matter, a system for generating a demographic profile for a set of at least one webpage, the system comprising a webpage audience information gatherer operative for providing, for at least one webpage, training data including demographic information characterizing an audience of the webpage; and a predictor developing module using a processor to compute at least one content characteristic of the webpage and to develop a prediction process which if applied to the content characteristic would have predicted the training data, wherein the prediction process is constructed and operative to be employed by an audience predicting processor operative, for at least one new webpage whose audience is unknown, to compute at least one content characteristic of the new webpage and to generate predicted demographic information predicted to characterize the unknown audience of the new webpage by applying the prediction process to the new webpage's content characteristic.

In accordance with an embodiment of the presently disclosed subject matter, there is further provided a system comprising a webpage audience predicting processor operative, for at least one new webpage whose audience is unknown, to compute at least one content characteristic of the new webpage and to generate predicted demographic information predicted to characterize the unknown audience of the new webpage by applying the prediction process to the new webpage's content characteristic.

In accordance with an embodiment of the presently disclosed subject matter, there is further provided a system wherein the combining comprises averaging.

In accordance with an embodiment of the presently disclosed subject matter, there is yet further provided a system, wherein said demographic information characterizing an audience of the web page data, is associated in computer memory with web page data comprising actual html content.

In accordance with an embodiment of the presently disclosed subject matter, there is yet further provided a system wherein the demographic information characterizing an audience of the web page data is associated in computer memory with a uniform resource identifier identifying at least one webpage.

In accordance with an embodiment of the presently disclosed subject matter, there is yet further provided a system wherein webpage audience information gatherer is run as a onetime process.

In accordance with an embodiment of the presently disclosed subject matter, there is yet further provided a system wherein webpage audience information gatherer is run as a periodical batch job.

In accordance with an embodiment of the presently disclosed subject matter, there is yet further provided a system wherein webpage audience information gatherer is run continuously, generating a continuous stream of input training data.

In accordance with an embodiment of the presently disclosed subject matter, there is yet further provided a system wherein webpage audience information gatherer fetches demographic information characterizing an audience of the webpage from a supplier of demographic information characterizing webpage audiences.

In accordance with an embodiment of the presently disclosed subject matter, there is yet further provided a system wherein webpage audience information gatherer fetches demographic information characterizing an audience of the webpage from click-stream data of a user-panel with known demographics.

In accordance with an embodiment of the presently disclosed subject matter, there is yet further provided a system wherein webpage audience information gatherer provides demographic information characterizing an audience of the webpage by monitoring social media streams.

In accordance with an embodiment of the presently disclosed subject matter, there is yet further provided a system wherein the webpage audience information gatherer utilizes information provided by social media platform users' public homepages on which at least one demographic characteristic is explicitly stated.

In accordance with an embodiment of the presently disclosed subject matter, there is yet further provided a system comprising a feature extraction unit serving at least one of the predictor developing module and the webpage audience predicting processor.

In accordance with an aspect of the presently disclosed subject matter, there is yet further provided a system wherein the feature extraction unit is operative to extract at least one word from webpage textual content.

In accordance with an embodiment of the presently disclosed subject matter, there is yet further provided a system wherein the feature extraction unit is operative to extract at least one stylistic writing feature.

In accordance with an embodiment of the presently disclosed subject matter, there is yet further provided a system wherein the stylistic writing feature includes use of parts of speech.

In accordance with an embodiment of the presently disclosed subject matter, there is yet further provided a system wherein the stylistic writing feature includes sentence length.

In accordance with an embodiment of the presently disclosed subject matter, there is yet further provided a system wherein the feature extraction unit is operative to extract at least one html specific feature.

In accordance with an embodiment of the presently disclosed subject matter, there is yet further provided a system wherein the feature extraction unit comprises a web content fetching tool.

In accordance with an embodiment of the presently disclosed subject matter, there is yet further provided a system wherein the feature extraction unit caches content thereby to enhance efficiency and/or reduce web traffic volume.

In accordance with an embodiment of the presently disclosed subject matter, there is yet further provided a system wherein the content fetching unit performs page cleaning to remove sections of pages which do not contain main content essence of the pages.

In accordance with an embodiment of the presently disclosed subject matter, there is yet further provided a system wherein the feature extraction unit is operative to extract at least one design feature representing visual design aspects of content and derived from markup language.

In accordance with an embodiment of the presently disclosed subject matter, there is yet further provided a system wherein the feature extraction unit is operative to extract at least one feature relating to a content identifier of a web page.

In accordance with an embodiment of the presently disclosed subject matter, there is yet further provided a system wherein the feature extraction unit is operative to extract at least one feature relating to a content identifier of a web-site.

In accordance with an embodiment of the presently disclosed subject matter, there is yet further provided a system wherein the feature extraction unit is operative to extract at least one feature from meta-data supplied with a web-page.

In accordance with an embodiment of the presently disclosed subject matter, there is yet further provided a system wherein the feature extraction unit extracts at least one feature from information about a web-site obtained from a 3rd party provider.

In accordance with an embodiment of the presently disclosed subject matter, there is yet further provided a system wherein the feature extraction unit extracts at least one feature from site information mined from the Internet.

In accordance with an embodiment of the presently disclosed subject matter, there is yet further provided a system wherein the feature extraction unit extracts a typification of a website from an existing website categorization information repository.

In accordance with an embodiment of the presently disclosed subject matter, there is yet further provided a system wherein the feature extraction unit extracts overall site demographic statistics obtained from a web-site demographic statistics information repository.

In accordance with an embodiment of the presently disclosed subject matter, there is yet further provided a system wherein the webpage audience predicting processor includes a plurality of classifiers respectively trained for a plurality of types of features.

In accordance with an embodiment of the presently disclosed subject matter, there is yet further provided a system wherein the prediction process includes a plurality of individual models for each of the plurality of types of features and wherein the classifiers apply the individual models respectively thereby to generate a plurality of outputs.

In accordance with an embodiment of the presently disclosed subject matter, there is yet further provided a system wherein the plurality of outputs is combined by majority voting.

In accordance with an aspect of the presently disclosed subject matter, there is yet further provided a method for generating a demographic profile for a set of at least one webpage, the system comprising providing, for at least one webpage, training data including demographic information characterizing an audience of the webpage, computing at least one content characteristic of the webpage and developing a prediction process which if applied to the content characteristic would have predicted the training data, and for at least one new webpage whose audience is unknown, computing at least one content characteristic of the new webpage and generating predicted demographic information predicted to characterize the unknown audience of the new webpage by applying the prediction process to the new webpage's content characteristic.

In accordance with an embodiment of the presently disclosed subject matter, there is yet further provided a system wherein the webpage audience predicting processor is operative to perform a new webpage learning process including comparing output of the prediction process as applied to the new webpage, to new webpage audience information, if known, and updating the prediction process accordingly.

In accordance with an embodiment of the presently disclosed subject matter, there is yet further provided a system wherein the webpage audience predicting processor is also operative to perform website-level processing including combining the demographic information over all pages in the site.

In accordance with an aspect of the presently disclosed subject matter, there is yet further provided a system for generating a demographic profile for a set of at least one webpage, the system comprising a audience predicting processor operative, for at least one new webpage whose audience is unknown, to compute at least one content characteristic of the new webpage and to generate predicted demographic information predicted to characterize the unknown audience of the new webpage by applying a prediction process to the new webpage's content characteristic, the prediction process being characterized in that if applied to at least one content characteristic of a webpage whose audience's demographic information is known, the prediction process predicts training data including known demographic information characterizing an audience of the webpage.

In accordance with an embodiment of the presently disclosed subject matter, there is yet further provided a system wherein the audience information gatherer is operative to crawl user profile pages of social media.

In accordance with an embodiment of the presently disclosed subject matter, there is yet further provided a system wherein extraction is customized by specifying where the user profile information is found on the page.

In accordance with an embodiment of the presently disclosed subject matter, there is yet further provided a system wherein the audience information gatherer employs social media public APIs to provide user profile information in a structured format.

In accordance with an embodiment of the presently disclosed subject matter, there is yet further provided a system wherein the audience information gatherer runs iteratively over users, by following suitable links, so as to obtain a larger set of different users.

In accordance with an embodiment of the presently disclosed subject matter, there is yet further provided a system wherein the audience information gatherer is operative for identifying user profiles with explicit demographic characteristics stated in a profile page and adding these to a user panel; and monitoring data stream in social media platforms of users in panel, identifying posts referencing at least one web page; and adding web page URI with demographic characteristics of user to a training data repository.

In accordance with an embodiment of the presently disclosed subject matter, there is yet further provided a system wherein the predictor developing module is operative for obtaining training data from the training data repository, fetching any missing content, passing individual content examples to a feature extraction unit which is operative to provide representative features of each training content item, and using content items represented as features along with corresponding target demographic characteristics as input to a supervised learning process thereby to obtain a prediction model predicting demographic characteristics of a page audience, as a function of page features.

In accordance with an embodiment of the presently disclosed subject matter, there is yet further provided a system wherein the obtaining training data includes obtaining available input from the training data repository and fetching any missing content.

In accordance with an embodiment of the presently disclosed subject matter, there is yet further provided a system and wherein the fetching comprises calling a content fetcher and cleaning at least one page fetched thereby, leaving only a content section of the page.

In accordance with an embodiment of the presently disclosed subject matter, there is yet further provided a system wherein the webpage audience predicting processor is operative for obtaining input content whose audience is unknown from an input data repository, passing at least one individual content example to a feature extraction unit which is operative to provide representative features of each training content item, and passing content items represented as features to a classifier which runs a prediction model and obtains demographic characteristic predictions.

In accordance with an embodiment of the presently disclosed subject matter, there is yet further provided a system wherein, if multiple items from a single site were passed as input, the webpage audience predicting processor is operative for computing a central tendency of the individual content predictions to obtain site-level statistics.

In accordance with an aspect of the presently disclosed subject matter, there is yet further provided a computer program product, comprising a computer usable medium having a computer readable program code embodied therein, the computer readable program code adapted to be executed to implement a method as shown and described herein.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 4 is an example of a work session using the method of FIG. 3 with illustrative data, the method including some or all of the illustrated steps, suitably ordered e.g. as shown.

FIG. 5 is a simplified flowchart illustration of an example of running a learning process over training data including two web-pages tagged with gender attributes, the running method including some or all of the illustrated steps, suitably ordered e.g. as shown.

FIG. 10 is a pictorial illustration of a first example user interface demonstrating usage of an implementation of system of FIG. 1a, constructed and operative in accordance with certain embodiments of the present invention, in particular for inputting text e.g. as per the method of FIG. 3.

FIG. 11 is a pictorial illustration of a second example user interface demonstrating usage of an implementation of the system of FIG. 1a, constructed and operative in accordance with certain embodiments of the present invention e.g. as per the method of FIG. 3.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

Figure 1A:
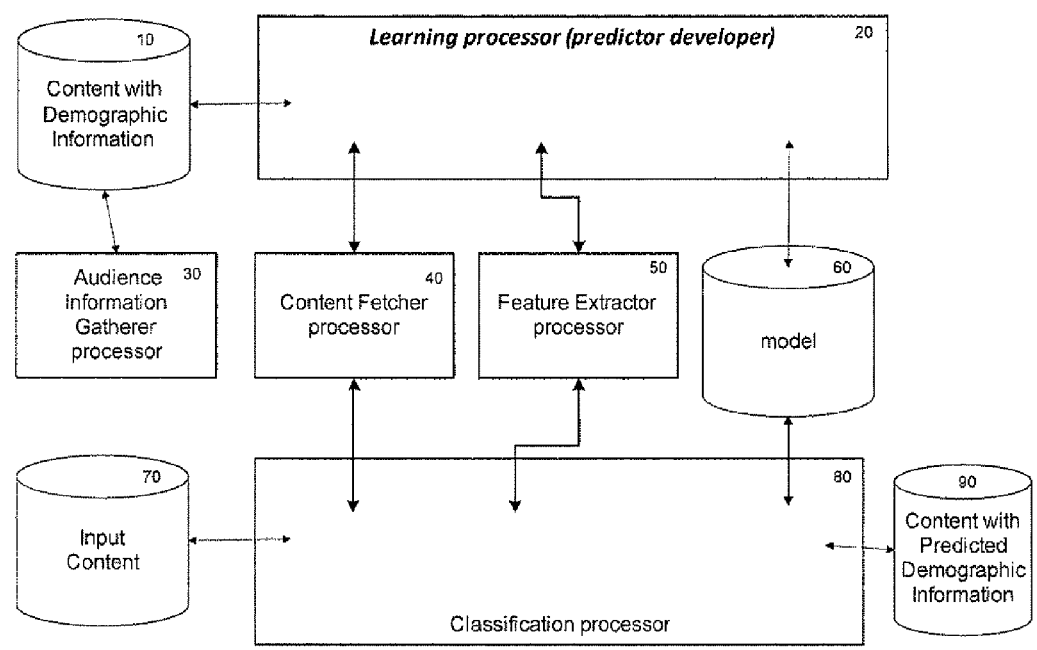
FIG. 1a is a simplified functional block diagram illustration of a High Level System Architecture of a computerized webpage audience predictor system for analyzing a webpage and predicting its audience accordingly, all constructed and operative in accordance with certain embodiments of the present invention.

It is appreciated that any computer data storage technology, including any type of storage or memory and any type of computer components and recording media that retain digital data used for computing for an interval of time, and any time of information retention technology, may be used to store the various data provided and employed herein, e.g. in storage units 10, 60, 70 and 90 of FIG. 1a. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

FIG. 1a is a simplified functional block diagram of a computerized webpage profiling system, according to an embodiment of the present invention. According to certain embodiments, the system of FIG. 1a accepts either single or multiple pages as input and computes the demographic characteristics of the individual pages and, optionally, aggregates statistics over all pages.

The system of FIG. 1a is typically operative for generating a demographic profile for a set of at least one webpage and typically includes, e.g. as described in detail below:

a webpage audience information gatherer operative for providing, for at least one webpage, training data including demographic information characterizing an audience of the webpage; and a predictor developing module using a processor to compute at least one content characteristic of said webpage, typically by obtaining representative features of each training content item e.g. as described below with reference to FIG. 2, step 330; and to develop a prediction process which if applied to said content characteristic would have predicted said training data, e.g. as described herein with reference to FIG. 2, step 340 and FIG. 12;

wherein the prediction process is constructed and operative to be employed by an audience predicting processor operative, for at least one new webpage whose audience is unknown, to compute at least one content characteristic of the new webpage and to generate predicted demographic information predicted to characterize said unknown audience of said new webpage by applying said prediction process to said new webpage's content characteristic.

The system of FIG. 1a typically comprises an audience information gatherer processor 30, a learning unit e.g. processor 20 also termed herein the "predictor developer" or "predictor developing module", and a classification unit e.g. processor 80 also termed herein the "webpage audience predictor" or "webpage audience predicting processor". Suitable methods of operation for these processors are described herein in detail with reference to FIGS. 1b, 2 and 3 respectively. Also provided are computer data storage units for storing input to and output from the processors e.g. as described below. It is appreciated that any other suitable storage configuration or architecture may be used alternatively.

The audience information gatherer 30 typically generates content with demographic information which may be stored in data storage receptacle 10 for use inter alia by learning processor 20 which in turn is typically operative to generate a model which may be stored in data storage receptacle 60. The input to content fetcher processor 40 may include URL information as described herein and processor 40's output may include html content e.g. as described below with reference to table a, field A3. The input of feature extractor processor 50 may include URL information associated with content e.g. as described below with reference to table a, fields A1 and A2. Feature extractor processor 50's output may include a list of features, each identified by a suitable identifier/name, each optionally associated with a numeric weight or strength value. The input to classification processor 80 may include suitable input content stored in data storage receptacle 70 as described herein; classification processor 80's output may be stored in data storage receptacle 90 as described herein.

The system of FIG. 1a is operative for generating a demographic profile for a set of at least one webpage. Typically, the webpage audience information gatherer 30 is operative for providing, for at least one webpage, training data including demographic information characterizing an audience of the webpage. The predictor developer 20 may be operative to compute at least one content characteristic of said webpage and to develop a prediction process which, if applied to said content characteristic, would have predicted said training data. The webpage audience predictor 80 may be operative, for at least one new webpage whose audience is unknown, to compute at least one content characteristic of the new webpage and to generate predicted demographic information predicted to characterize said unknown audience of said new webpage by applying said prediction process to said new webpage's content characteristic.

The audience information gatherer 30 typically generates training data for the learning process. The training data may comprise web pages associated with demographic information characterizing the audience of these web pages. The learning unit may be operative to create a classification model, also termed herein a "prediction process" or "prediction model", based on the processed input of content pages that may be accompanied by demographic characteristics of the user who viewed it. The classification model, when used by classifier 80, accepts content pages of unknown demographic characteristics as input and applies the classification model to assign demographic characteristics to the supplied content pages.

Two additional units 40, 50 may be provided for each of, or shared by both of, the learning unit 20 and the classification unit 80: A content fetcher sub-unit 40 may be operative to fetch the content and any related content meta-data of input pages which may be given as a URL or other form of a uniform resource identifier. The content fetcher 40 may be based upon suitable freeware such as but not limited to wget, or curl. The feature extraction unit 50 may be operative to extract features from the content to be used by learning and classification units 20 and/or 80. A suitable method of operation for feature extraction unit 50 is described herein with reference to FIG. 6. The system(s) provided in accordance with certain embodiments of the present invention may be physically located on one or more servers, provided over a data network, such as the Internet.

The audience information gatherer 30 may be operative for generating training data used as input for the learning process of unit 20. The training data may include web pages e.g. actual html content or web pages noted by a uniform resource identifier, along with demographic information characterizing an audience of the web pages. The unit 30 may run as a onetime process, a periodical batch job or may continuously generate a continuous stream of input training data. According to one embodiment, this unit 30 fetches any such available data e.g. from a $3^{rd}$ party supplier of such data such as Nielsen or Comscore, and passes it on to the learning process. Another embodiment of the invention involves obtaining input data from click-stream data of a user-panel with known demographics. Maintaining and monitoring user panels may be conventionally performed by existing web measurement companies such as Comscore, Quantcast, Nielsen or Hitwise. User panel demographic characteristics may be obtained via a questionnaire and monitoring may be done via an installed desktop application or a web browser plugin. Another embodiment involves monitoring social media streams for content references. Most existing social media platforms (e.g. Twitter, Facebook, Myspace or Bebo) enable users to share content or content references with the rest of the members of the network. In addition, users of social media platforms maintain an access-available computer network presence e.g. public profile page with various demographic characteristics explicitly stated. For example, many Facebook users state their gender (sex) and/or relationship status in their public profile page. One way to leverage such social media is to obtain a panel of social media users, suitably identified e.g. by their username for whom explicit demographic characteristics may be supplied in profile pages. The user panel social stream may be then monitored to spot any references to web content in the panel social stream. Example: A "real-world" user, identified by a username, specified that she is female and commented/shared a link; in which case this link may be added as a positive example for female links.

Figure 1B:
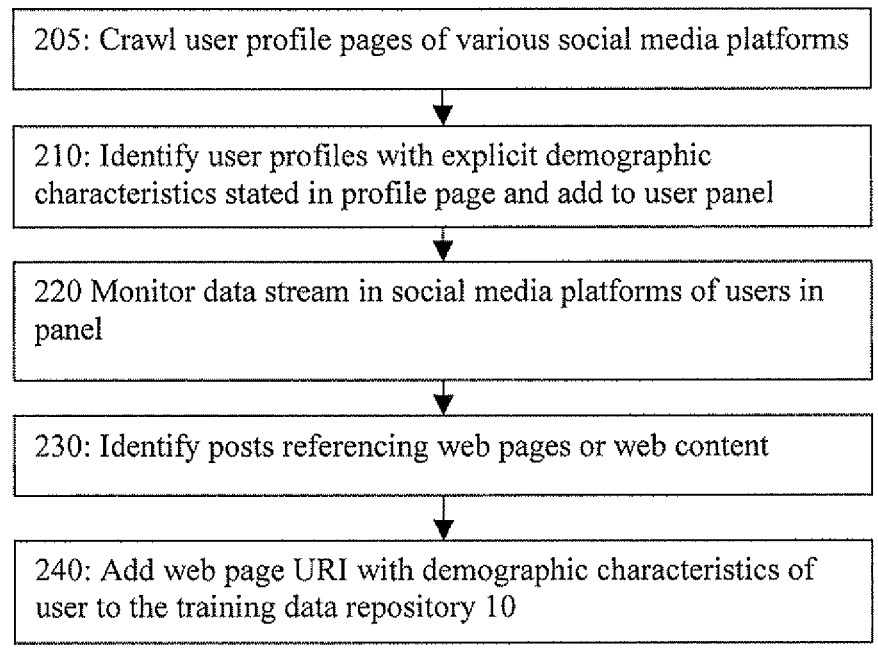
FIG. 1b is a simplified flowchart illustration of a social network based method of operation for the audience information gatherer of FIG. 1a, operative in accordance with certain embodiments of the present invention, which method includes some or all of the illustrated steps, suitably ordered e.g. as shown; it being appreciated that the method of operation for the audience information gatherer of FIG. 1a need not necessarily avail itself of social networks.

The flow of a possible social stream based embodiment of the audience information gatherer is shown in FIG. 1b.

The system of FIG. 1a is typically provided as a cookie free, in a depth web audience targeting platform that leverages the audience data to other computerized applications directly.

Example data structures for the databases or computerized information repositories of FIG. 1a are as follows:

Content with Demographic Information repository (training data repository) 10 of FIG. 1a may include some or all of the following tables a, b; each including one, some or all of the fields described in conjunction therewith. For example, content fetcher 40 may receive table A1 as input and may fill table A2 as output. Table A3 may be used by content fetcher 40 to re-fetch content of page if the last time this was fetched exceeds a certain typically pre-determined time period threshold.

TABLE a

Training Data. Fields may include one or more of:

A1. URI - the URL or other resource indicator of the content
A2. Content - optional, actual content of the content (could be text or binary blob)
A3. Time Stamp - optional, when this content was fetched
A4. Source - optional, from where (e.g. Twitter or Facebook) or via what method (e.g. feed from $3^{rd}$ party or a certain embodiment of audience information gatherer unit 30) this content was fetched TABLE b Demographic Characteristics of content. Fields may include one or more of:

B1. URI - URI of content (may be joined with URI in training data table a)
B2. Demographic Characteristic Type—e.g. gender, age_group or occupation
B3. Demographic Characteristic Value—e.g. male, 18-25 or nurse Model repository 60 of FIG. 1a may include some or all of the following tables c, d, e; each including one, some or all of the fields described in conjunction therewith:

TABLE c

Models. Fields may include one or more of:

C1. ID: a unique identifier
C2. Target Characteristic Type—e.g. gender, age_group or occupation
C3. ModelType: optional, an indicator of the algorithm used to create the model, such as but not limited to naïve Bayes, svm, maximum entropy, or decision tree.
C4. TimeStamp: optional, indicates when time model was created.

TABLE d

Model (algorithm specific, shown here for common linear separator algorithms types such as winnow, svms, naïve bayes, etc. - other algorithms may have different model structure). Fields may include one or more of:

D1. Model ID - ID to be joined with ID in Models table (e)
D2. Feature Name: an identifier for the feature. Typical implementations use intuitive names for the various features (e.g. TextToken_demographics, TextToken_knowledge, TextLength, AdjectiveFrequency, AvgSentencesPerParagraph, HasImage, . . . ) other implementations may use automatically generated feature identifiers as a name.
D3. Feature Weight: the numeric weight of each feature in D2 above

TABLE e

Model Params: to hold any additional model configuration params.
Fields may include some or all of:

E1. Model ID - ID to be joined with ID in Models table (e)
E2. Param name - may vary depending on algorithm use. For example in svm classification, config may include type of kernel used
E3. Param Value - associated respectively with the parameter names E2.

Input Content repository 70 of FIG. 1*a* may include the following table f:

TABLE f

Training Data - may be Identical to Training Data [table a] above

Content with Predicted Demographic Information repository 90 of FIG. 1*a* may include one or both of the following tables: g, h; each including one, some or all of the fields described in conjunction therewith:

TABLE g

Demographic Information - may be identical to Characteristics of content [table b] above

TABLE h aggregate statistics. Fields may include one or more of:

H1. Group ID - optional, an identifier for a group (for example, could be the domain derived from the URI)
H2. Demographic Characteristic Type—e.g. gender, age_group or occupation
H3. Demographic Characteristic Value—e.g. male, 18-25 or nurse
H4. Probability - the percent of Characteristic Value (H3) in overall instances of Characteristic Type (H2) within group.

FIG. 11 is an example of a computerized visual interface demonstrating usage of an implementation of the system of FIG. 1*a*, constructed and operative in accordance with certain embodiments of the present invention. FIG. 11 is a simplified pictorial illustration of a possible display of the aggregate results of audience demographics for a given website. As shown, an Audience Demographics Report for an individual website or webpage may be provided, including some or all of a Breakdown 1120 of semantic content Categories (Politics and Government 13.5%, Business and Finance 13%, Sports 9.9%, etc. in the illustrated example), A Breakdown 1130 of Age Demographics (e.g. Ages 25-34:23.75%, Ages 18-24: 21.65%, etc. in the illustrated example) and a Breakdown 1140 of Gender Demographics (e.g. Male: 59.41%, Female: 40.50% in the illustrated example). The pie chart display 1140 of the breakdown of values for the gender demographic characteristic is typically obtained from aggregate statistics data in table h.

The term "join" as used hereinabove refers to a database handling e.g. SQL term in which a certain key is used to tie two or more tables. For example, re the Training Data Table A, the system may determine what Content the Demographic Characteristics refer to by "joining" the two tables A and B, using a common URI.

The term "model" as used hereinabove refers to a machine learning term; in machine learning, a "learning process" occurs in which a supervised classifier builds a "model" from "training examples". The model may be used to predict a category of a new example. For example, a. If svmlight is employed e.g. as per the http link of svmlight.joachims.org, then the learning process creates a model file as output:
svm_learn [options] example_file model_file
b. if WEKA is employed, e.g. as per the http link of .cs.waikato.ac.nz/ml/weka Decision Tree, the method may run learning and create a model file as follows:
java weka.classifiers.trees.J48-t/some/where/train.arff-d/other/place/j48.model The term "algorithm" as used herein refers to a computer process, implemented in any suitable manner e.g. as:
  a. a Support Vector Machine (e.g. as implemented in SVM-Light) or
  b. J48 Decision Tree Classifier e.g. as implemented in WEKA.

Different embodiments may use variations, at any level, of the structure specifically shown and described herein. For example, one or more of the following variations, which are merely exemplary, may be provided:

1. an alternative data structure for model repository 60 is now described:

Table d: Model (algorithm specific, e.g. for common linear separator algorithms types such as winnow, svms, naïve bayes, etc.—other algorithms may have other model structures)
      Model ID—ID to be joined with ID in Models table
      Model File—Location of model file on disk
   This "alternative option" may be employed when using software which creates a model file. In such cases, instead of specifying the content of the model, it may be sufficient to specify the location of the file on disk.

2. Data need not be stored in databases. Embodiments may alternatively use file formats or any other manner of storing the data. For instance, it is common to store the classification model in file format as output of a learning algorithm.

3. Each of the subunits of the system (e.g. learner 20, audience information gatherer 30 and classifier 80) may have databases of their own rather than having common databases serving more than one of these subunits as illustrated in FIG. 1*a*.

4. the two model tables d and e (Model+Model Params) may be replaced with a single table including one big model blob as returned by learning process in format as specified by learning software.

Figure 2:
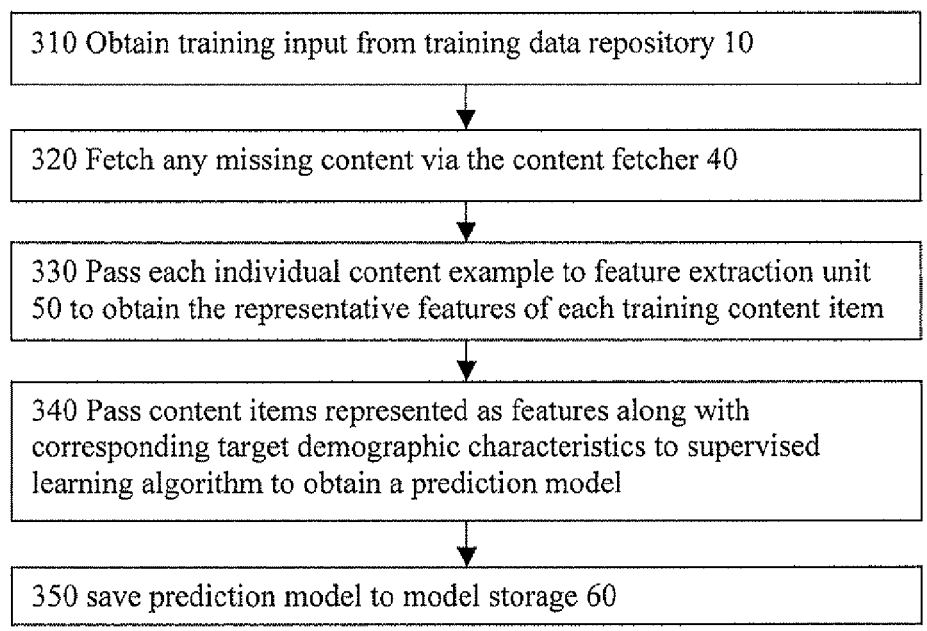
FIG. 2 is a simplified flowchart illustration of a method of operation for the Learning Unit of FIG. 1a, operative in accordance with certain embodiments of the present invention, which method includes some or all of the illustrated steps, suitably ordered e.g. as shown.

The learning unit 20 may use a conventional supervised learning flow e.g. as illustrated in FIG. 2. The learning unit 20 obtains from the audience information gatherer 30 as input individual pages each associated with demographic characteristics of a specific user that viewed the page. Input data may be obtained from the audience information gatherer unit. First, any missing content may be fetched via the content fetcher 40. The fetched content may be then passed to the feature extraction unit 50 which extracts various features to represent the data for learning. Features may include but are not limited to any or all of the following: content words in page textual content, stylistic writing features (use of parts of speech such as but not limited to all or certain pronouns, sentence length) as well as html specific features (pertaining to usage of bold text, color, presence of images, etc.).

The learning unit 20 then runs a Supervised Learning classification algorithm over the processed training data to obtain a classification model. Any supervised classification algorithms may be used. Examples of well-known algorithms for which implementations are available include Support Vector Machines (SVMs), Naïve Bayes Classifier or Random Forest classification. All mentioned methods process input examples which may be represented as a set of (optionally weighted) features along with a discrete target class value. In certain settings e.g. as described herein, the class value is the demographic characteristic of the input example.

FIG. 5 is a simplified flowchart illustration of an example of running a learning process over training data including a training input of two web-pages tagged with gender attributes. Step 630 is an illustrative example of the representation of the input training data as a set of weighted features e.g. as is conventional in Text Processing.

According to certain embodiments, the learning algorithm is applied once and a separate model is learned for each demographic type (e.g. age, gender, marital status). Thus the resulting learning model may include the various demographic type specific models. For demographic types such as age-group which have multiple target values, a multi-class classification algorithm or technique may be applied.

Figure 3:
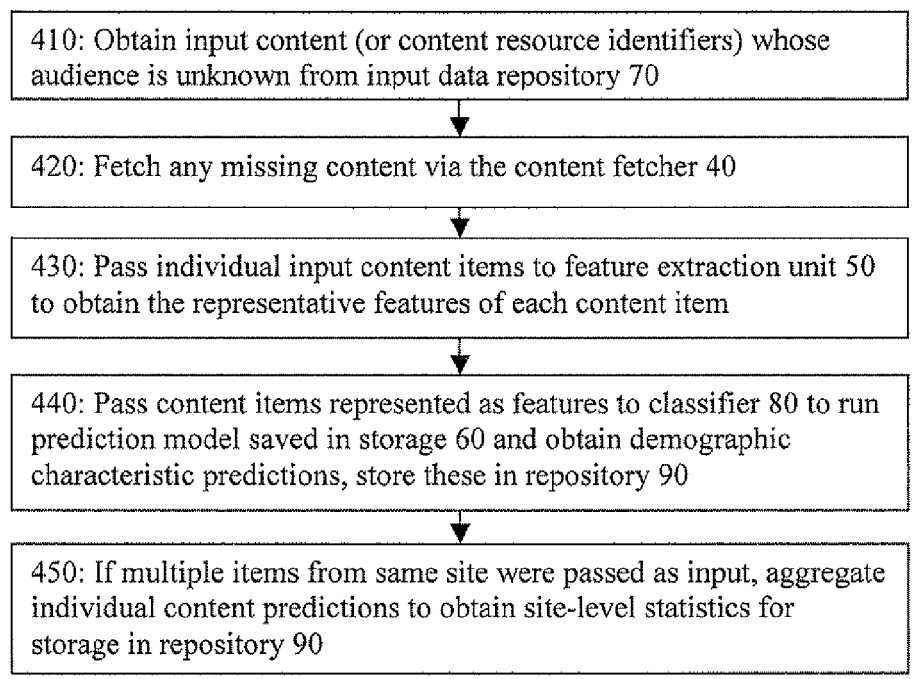
FIG. 3 is a simplified flowchart illustration of a method of operation for the Classification Unit of FIG. 1a, operative in accordance with certain embodiments of the present invention, which method includes some or all of the illustrated steps, suitably ordered e.g. as shown.

The classification unit 80 may follow a conventional flow of a supervised classifier. A simplified flowchart illustration of a possible method of operation for unit 80, according to an embodiment of the invention, is illustrated in FIG. 3 and described in detail below. Typically, content of unknown demographic characteristics is passed to the classification unit 80 as input. If the content is not supplied per se as input but rather only via a resource identifier, content may be first fetched via the content fetcher 40. The content may be passed to the feature extraction unit 50 to obtain the features in the same manner as in the learning process as described above. The processed content represented as a set of features may be passed to the classification unit 80 to obtain the demographic characteristics of the input content. Classification unit 80 applies the learned model obtained during the learning process of unit 20. The result of the classification process typically includes, for each input-content and for each demographic characteristic type, a characteristic value along with a corresponding confidence score for that value. If multiple input content items are passed to classification system 80, in addition to the individual per-item predictions (where in this case, item=URL=webpage=input=content), an overall aggregate of the predictions may be passed as an additional result. The aggregate result may be computed as a simple average (or histogram) over the individual results. This output may be useful, for example, when multiple content items from the same site (or section of a site) are passed and site-level (or sub-site) level statistics are of interest.

According to another embodiment of the present invention a configurable threshold may be applied for each demographic characteristic type (where "type" may, for example, refer to Gender or Age, vs. "value" may refer to values assumed by each type, e.g. Male or Female). If predicted score of resulting demographic values falls below the threshold, the system does not return any value for that demographic characteristic type. This "abstaining" behavior may be applied in applications in which precision is important and is deemed more suitable than recall in a given application setting.

Content Fetcher unit 40 may comprise a standard component to fetch web content. A possible implementation simply applies common tools for content fetching—e.g. wget or curl. According to another embodiment of the present invention the content fetcher unit may apply caching of the content for efficiency proposes and to reduce web traffic volume. According to another embodiment of the present invention content fetching unit may perform page cleaning to remove sections of page which do not contain the main content essence of the page. Available cleaning services exist and are available for commercial use—e.g. Purifyr which has a web presence at purifyr.com.

The feature extractor unit 50 typically analyzes content to extract features that may correlate to demographic characteristics of the audience consuming the content. The features may be of any suitable type such as but not limited to any of the following four types: (a) textual features, (b) design features, (c) stylistic writing features and (d) context features, each e.g. as now described in detail.

(a) Textual features include the individual words in the page or sequences, phrases or other extracted patterns from the text. Filtering the huge amount of textual features so as to leave only meaningful textual features is known. Stop word lists (e.g. as defined in Wikipedia) allow filtering of non informative words such as "the" or "and". For example, the freely available Lucene Search Engine (web presence at http://lucene.apache.org) supplies software for text tokenization and stop word filtering. In addition, feature selection may be performed conventionally over the extracted features to further filter non-informative features. Details on conventional text processing and feature selection for text classification can be found in: Christopher D. Manning, Prabhakar Raghavan and Hinrich Schütze, *Introduction to Information Retrieval*, Cambridge University Press. 2008. Furthermore, textual token features extracted from the text may be assigned weights. A common weighting paradigm is known as the vector space model for text in which a tf-idf weighting scheme is used. Details for vector space model tf-idf feature weighting may be found in chapter 6 of the above referenced text by Manning et al. Typically, such tf-idf values are normalized for every item based on, for example, the max tf-idf value for that item. In addition to n-gram based features, an embodiment of the invention may apply other topical features such as topical categories as obtained by a pre-defined text categorization system. Such textual features capture the topical meaning of the text and thus facilitate learning the correlation between topics of interest and demographic characteristics of users.

(B) Design features include features derived from the html (or other markup languages) markup of the content. Such design features capture the visual design aspects of the content (e.g. background color or font size). Specifically, a design feature may include features such as number of tags, existence of images, font size, font family, font colors, background colors and so on.

(C) Stylistic writing features include features derived from the textual content pertaining to the writing style of the text rather than the semantic topic of the text. Examples of such features include usage of use of predetermined parts of speech such as but not limited to all or certain pronouns, average sentence length, text length ngram features of the part of speech tags corresponding to the text, use of slang words or any style features that were used and shown effective for determining author demographics (as described herein in the Background section).

To illustrate the difference between topical text features (A) to stylistic writing features (C), take, for example, a Wall Street Journal article about a contemporary popular rock star. Based on the main topic words of the text, one would assume the audience of the article to be youngsters. However, given the writing style of article and ignoring content words, it would be assumed that the article's audience is probably adults. Such stylistic features have been successfully used to infer a text's author demographic characteristics as described herein in the Background section.

(D) A fourth type of features are features relating to the content identifier (e.g. the URL of a web page) and/or to the web-site to which the content belongs and/or relating to any meta-data supplied with the page. Such features, e.g. as described herein with reference to FIG. 6, generally capture the overall behavior of a certain site, a specific section in a site or a set of sites.

Examples of such features include the domain of the site, the various parts of the content URI or information about the site possibly obtained from a 3rd party provider or by mining site information available on the Internet. Such site information may include the type or category of the website e.g. as denoted in dmoz.org or alexa.com. Another type of site information that may be applied is overall site demographic statistics obtained from companies like Quantcast, Alexa or Comscore. For example, a webpage whose URL begins conventionally with http and www followed by: womenshealthmag.com/weight-loss/get-a-flat-tummy may add features capturing the domain name e.g. www followed by womenshealthmag.com in the present example or section weight-loss or features (e.g. website size) may be added based on suitable information obtained in the womenshealthmag.com site such as page count in the site, in conjunction with existing training examples relating page count to website size in other sites.

In an embodiment of the invention a separate classifier is trained separately for each of the four types of features. The resulting model from the learning unit may include the individual models for each feature type. The classification unit applies each model separately and performs prediction based on a majority voting (or any other scheme common in ensemble learning) over the three outputs.

An example method of operation of the apparatus of FIG. 1a may include some or all of the following operations:

a. Obtain, e.g. as input individual pages each tied to demographic characteristics of a specific user that viewed the page (examples are click-stream data of users from panel with known demographics, URLs supplied from a social media stream from users with specified demographics in profile, etc.); this step may be performed by the audience information gatherer 30 and provided to the learning unit 20 e.g. as described with reference to FIG. 1b and step 310 of FIG. 2.

b. Extract features from page for learning. Features include content words in page textual content, stylistic writing features (use of use of parts of speech such as but not limited to all or certain pronouns, sentence length) as well as html specific features (bold, color, images, etc.), e.g. as described with reference to step 330 of FIG. 2.

c. (FIG. 2, step 340) Run a known Supervised Learning classification algorithm over the training data to obtain a classification model. Examples of classification algorithms that may be used include Support Vector Machines (SVMs), Naïve Bayes Classifier or Random Forest classification. All methods process input examples with discrete class values. A separate model may be trained for each different demographic characteristic (e.g. age, gender, marital status etc.).

d. For a given page that has unknown audience information, use the classifier 80 of FIG. 1a to analyze the page as in step 330 of FIG. 2, and run the classification model to predict the reader's expected demographics. The result of classification may comprise, for each demographic characteristic, characteristic values along with corresponding confidence scores.

e. Retrieving a plurality of content items or content item identifiers e.g. as per FIG. 3, step 410.

f. (If not supplied by operation (e) above), retrieving data being related to each content item, such as but not limited to HTML content of a page, giving rise to the retrieved data, e.g. as per FIG. 3, step 420 g. Analyzing said retrieved data for determining one or more demographic characteristics of each corresponding content item, e.g. as per FIG. 3, step 430 h. Classifying said each content item to one or more predefined demographic categories such as gender or age values, according to the determined one or more demographic characteristics, e.g. as per FIG. 3, step 440.

Example methods of operation of units 30, 20 and 80 of FIG. 1a specifically are illustrated herein in FIGS. 1b, 2 and 3. The methods of operation of units 30, 20 and 80 of FIG. 1a, e.g. as per FIGS. 1b, 2, 3 respectively may be performed according to any suitable schedule, e.g. only once per website, or continuously, or alternatively periodically, e.g. every month or every minute, and/or responsive to external activation.

Another alternative may be to run the method of operation of unit 30 continuously and run the method of operation of unit 20 periodically, or as soon as the method of operation of unit 30 has gathered significant enough additional data, relative to the last time the method of operation of unit 20 was performed. An advantage of this alternative is that it may be operative to adapt the model to new technologies, such as iPad or hybrid cars, and new trends such as current events.

The method of operation of unit 80 may be run any time input becomes available that is to be classified. Depending on the use case, this may occur only once per website, periodically, or continuously.

The methods of FIGS. 1b, 2, 3, 4 and 6 are now described in detail, according to certain embodiments.

FIG. 1b is a simplified flowchart illustration of a social network based method of operation for the audience information gatherer of FIG. 1a, operative in accordance with certain embodiments of the present invention; it being appreciated that the method of operation for the audience information gatherer of FIG. 1a need not necessarily avail itself of social networks. The method of FIG. 1b may include some or all of the following steps, suitably ordered e.g. as shown:

Step 205—Crawl user profile pages of various social media platforms e.g. using a suitable commercial product such as but not limited to 80legs, having a web presence at 80legs.com;.VelocityScapets Web Scraper Plus+, having a web-presence at VelocityScape.com, or iMacros's web-scraping tool, having a web presence at iopus.com, or using social media public APIs—e.g. Facebook Graph API having an http web-presence at developers.facebook.com/docs/reference/api/ or Twitter API having an http web-presence at dev.twitter.com; both of which supply an API to provide user profile information in a structured format.

If a crawling service is employed, extraction is typically customized by specifying where the user profile information is found on the page. For example, crawling tools typically have a GUI interface in which the user can highlight a piece of information s/he is interested in. If an API is used directly, the information to be extracted may be obtained from the structured result returned by API any given user name/id.

Step 210—Identify user profiles with explicit demographic characteristics stated in profile page and add to user panel. For example, if a demographic characteristic appears in structured form in a specific place on page, conventional Web Scraper tools are operative to extract any pre-specified field and supply their value as part of the tool. For example, in MySpace, age is commonly specified in public profile in second line from top to right of photo in format of "AGE years old". So, for a user identified as sarajones, scraping the following http web location: myspace.com/sarajones; will extract the age as 21 from the line: "21 years old".

Alternatively or in addition, profile information may be obtained in structured form from a public API such as Facebook Graph API and/or demographic characteristics may be supplied in structured form in a known field. For example, when specified publicly, a Facebook user's gender value is available in the field entitled 'gender' from xml profile data obtained by API for the user as explained at the following https location: graph.facebook.com/username. For example, for a Facebook user identified as sara.jones the api call at https location graph.facebook.com/sara.jones typically returns:

```
{
    "id": "600211871",
    "name": "Sara Jones",
    "first_name": "Sara",
    "last_name": "Jones",
    "username": "sara.jones",
    "gender": "female",
    "locale": "en_US"
}
```

It is appreciated that gender=female is explicitly specified in structured form.

Step 220—Monitor data stream in social media platforms of users in panel. For example, Gnip having a web presence at gnip.com is a commercially available service for retrieval of social media streams of data.

Step 230—Identify posts referencing web pages or web content e.g. by searching for url's (http . . . , www . . . , etc.) in texts of message/post.

Step 240—Add (e.g. "insert") web page URI with demographic characteristics of user to the training data repository 10.

FIG. 2 is a simplified flowchart illustration of a method of operation for the Learning Unit of FIG. 1a, operative in accordance with certain embodiments of the present invention. The method of FIG. 2 may include some or all of the following steps, suitably ordered e.g. as shown:

Step 310—Obtain (e.g. "select") training data from training data repository 10.

Step 320—Fetch any missing content by calling content fetcher 40 and typically, "cleaning" the fetched page leaving just the content section of the page, e.g. using Article text extraction methods such as any of those described at the following http web presence: tomazkovacic.com/blog/56/list-of-resources-article-text-extraction-from-html-documents/. Content may be deemed missing e.g. if it is unavailable or too old—e.g. as indicated by an empty/null A2 field in table a.

Figure 6:
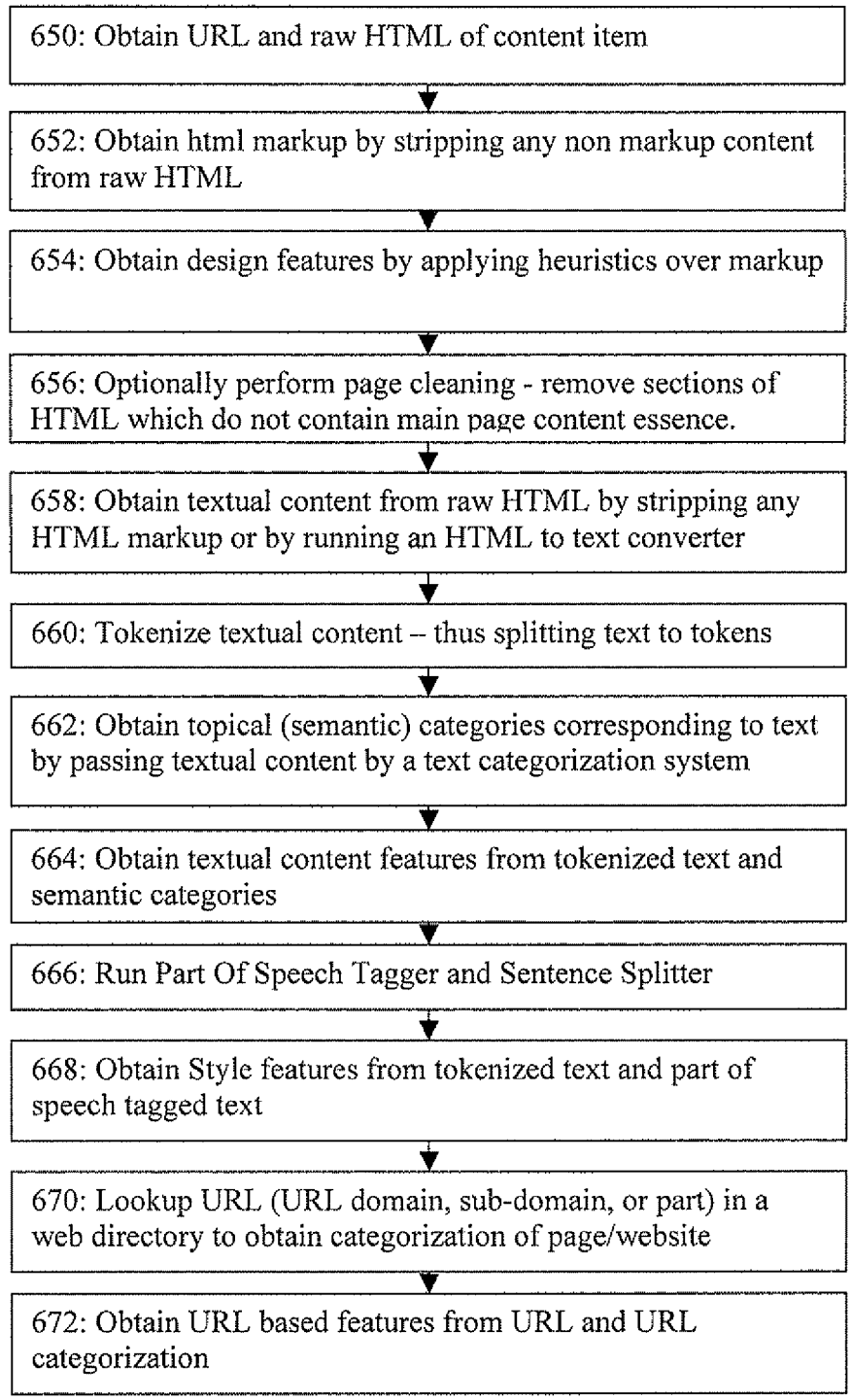
FIG. 6 is a simplified flowchart illustration of a method of operation for the feature extraction unit of FIG. 1a, operative in accordance with certain embodiments of the present invention, which method includes some or all of the illustrated steps, suitably ordered e.g. as shown, and which method is useful e.g. in implementing the representative feature obtaining step in both of the methods of FIGS. 2 and 3.

Step 330—Pass each individual content example (each page e.g.) to feature extraction unit 50 which is operative to provide representative or pertinent features of each training content item, e.g. using the method of FIG. 6. An example of how a page may be represented when passed to the learning/classification unit is shown herein in FIGS. 4 and 5.

Step 340—Pass content items represented as features along with corresponding target demographic characteristics to a suitable supervised learning algorithm such as but not limited to Support Vector Machines, linear regression, logistic regression, naive Bayes, linear discriminant analysis, decision trees, k-nearest neighbor algorithm, and Neural Networks (Multilayer perceptron); thereby to obtain a prediction model predicting demographic characteristics of a page audience, as a function of page features. Typically, feature pruning is performed prior to passing examples to learning algorithm e.g. using conventional feature selection technology and/or as described in the following http location: jmlr.csail.mit.edu/papers/special/feature03.html, or the following http www location: hpl.hp.com/techreports/2007/HPL-2007-16R1.pdf. An example method for performing step 340 is described below with reference to FIG. 12.

Step 350—save prediction model to model storage 60 e.g. in tables c, d, e.

FIG. 3 is a simplified flowchart illustration of a method of operation for the Classification Unit of FIG. 1a, operative in accordance with certain embodiments of the present invention, which method includes some or all of the following steps, suitably ordered e.g. as shown:

Step 410—Fetch (e.g. "select" for a database) input content (or content resource identifiers) whose audience is unknown from input data repository 70.

Step 420—Fetch any missing content via the content fetcher 40 e.g. as described above with reference to FIG. 2, step 320.

Step 430: May be the same as FIG. 2, step 330.

Step 440—Pass content items represented as features to classifier 80 to run prediction model saved in storage 60 and obtain demographic characteristic predictions which may be stored in repository 90 e.g. in table g.

Step 450—If multiple items from same site were passed as input, aggregate individual content predictions to obtain site-level statistics for storage in repository 90 typically by computing a histogram over prediction results of all input items for the same site e.g. as described hereinabove with reference to table h. Typically, for each demographic characteristic type, a histogram of counts of the various demographic characteristic values over the content predictions is generated.

FIG. 4 is an example of a work session using the method of FIG. 3. Information such as gender and other predictions generated in step 540 of FIG. 4 may be stored in Storage unit 90.

FIG. 6 is a simplified flowchart illustration of a method of operation for the feature extraction unit of FIG. 1a, operative in accordance with certain embodiments of the present invention, and useful e.g. in implementing the representative feature obtaining step in both of the methods of FIGS. 2 and 3.

The method of FIG. 6 typically includes some or all of the following steps, suitably ordered e.g. as shown:

Step 650: Provide URL and raw HTML of content item

Step 652: Obtain html markup by stripping any non markup content from raw HTML e.g. using siteopsys.com's html-markup-extractor.tool as described at the following http www online location: siteopsys.com/html-markup-extractor.tool. Typically, this may be done by removing all text nodes from the DOM representation of the HTML. Example html DOM parsers in java are described at the following http online locations: jtidy.sourceforge.net/, home.ccil.org/~cowan/XML/tagsoup/ and jsoup.org/. Step 654: Obtain design features by applying heuristics over markup, e.g. using conventional methods for applying structural features based on html content. The method described at the following http location may be used: citeseerx.ist.psu.edu/viewdoc/download?doi=10.1.1.129.9328&rep=rep1&type=pdf.

HTML features may be drawn from the raw DOM as known in the art. The HTML features may include some or all of individual tag counts, tag depths, "table" tag depths, script features such as but not limited to number of tags with JavaScript and/or unique function calls, in-page link analysis (such as but not limited to number of external vs. internal domain links and/or total number of links), and form analysis (such as but not limited to submission destination and/or element counts).

The following http www location: 2009.eprints.org/159/1/p1157.pdf teaches application of features that are language independent, such as but not limited to some or all of: HTML tag frequencies, layout, functional and typographical facets, as well as some or all of URL properties, text/mark-up ratios and CSS rule counts. URL properties as described herein are also pertinent to step 672 e.g. as described below.

Structural features based on HTML mark-up may include some or all of: tag density (e.g. the number of HTML tags divided by the number of words/tokens), number of links and link density (e.g. the proportion of tokens inside <a> tags), occurrence of certain tags and their count, and/or parent tag type, e.g. as described at the following http www location: presemt.eu/files/PRESEMT_D3_1_1.pdf.

Step 656: Optionally perform page cleaning—remove sections of HTML which do not contain main page content essence e.g. using conventional tools for web cleaning as described herein.

Step 658: Obtain textual content from raw HTML by stripping any HTML markup or by running an HTML to text converter, e.g. using conventional scripts for stripping html markup, sometimes termed "html2text" or "html to text", such as but not limited to jafsoft's detagger for Java, Perl's script, available at the following http on-line location: search.cpan.org/dist/HTML-Strip/Strip.pm, and bobsoft's html2text script.

Step 660: Tokenize textual content, thus splitting text to tokens, e.g. as described elsewhere herein or as described in section 2.2.1 of the publication having an http online location at nlp.stanford.edu/IR-book/html/htmledition/tokenization-1.html. For example, the Lucene Search Engine, which has a web presence at lucene.apache.org, supplies software for text tokenization. Another available technology is described at the following http online location: incubator.apache.org/opennlp/documentation/manual/opennlp.html.

Step 662: Obtain topical (semantic) categories corresponding to text by passing textual content by a text categorization system such as Peer39. Alternatively or in addition, opencalais.com supplies social tags for a given text input.

Step 664: Obtain textual content features from tokenized text and semantic categories e.g. as described in Chapters 12-15 of the publication having an http online location at nlp.stanford.edu/IR-book/html/html/edition/tokenization-1.html and/or as described in *Foundations of Statistical Natural Language Processing*, MIT Press. Cambridge, Mass.: May 1999, by Chris Manning and Hinrich Schütze, available at the following http location: nlp.stanford.edu/fsnlp/, and/or as described at the following http www online location: http://nlp.stanford.edu/fsnlp/.

Step 666: Run Part Of Speech Tagger and Sentence Splitter e.g. using conventional POS taggers and/or sentence splitters e.g. as described at the following http online location: nlp.stanford.edu/software/tagger.shtml and/or using Sentence detector, tokenizer, and/or POS tagger e.g. as described at the following http online location: incubator.apache.org/opennlp/documentation/manual/opennlp.html. Other suitable conventional technologies include Lingpipe whose http online location includes alias-i.com/lingpipe/ and alias-i.com/lingpipe/demos/tutorial/posTags/read-me.html and alias-i.com/lingpipe/demos/tutorial/sentences/read-me.html.

Step 668: Obtain Style features (e.g. genre, author gender detection) from tokenized text and part of speech tagged text e.g. as described in the above-referenced publications by Argamon and Koppel.

Step 670: Lookup URL (URL domain, sub-domain, or part) in a web directory to obtain categorization of page/website e.g. using dmoz or Alexa Technology.

Step 672: Obtain URL based features from URL and URL categorization e.g. as described in U.S. Pat. No. 7,565,350 or as described at the following scientific paper, available online: "Using Visual Features for Fine-Grained Genre Classification of Web Pages", Ryan Levering, Michal Cutler, and Lei Yu, Proceedings of the 41st Hawaii International Conference on System Sciences—2008. Features may also be extracted from the URL address of the Web pages e.g. static counts of URL length and the number of path levels in the URL (e.g. the number of slashes), and/or a dynamic list of the vocabulary found in the URL address which may be formed by taking any consecutive sequence of alphabetic characters, stemming it, and using it as a feature.

Figure 7:
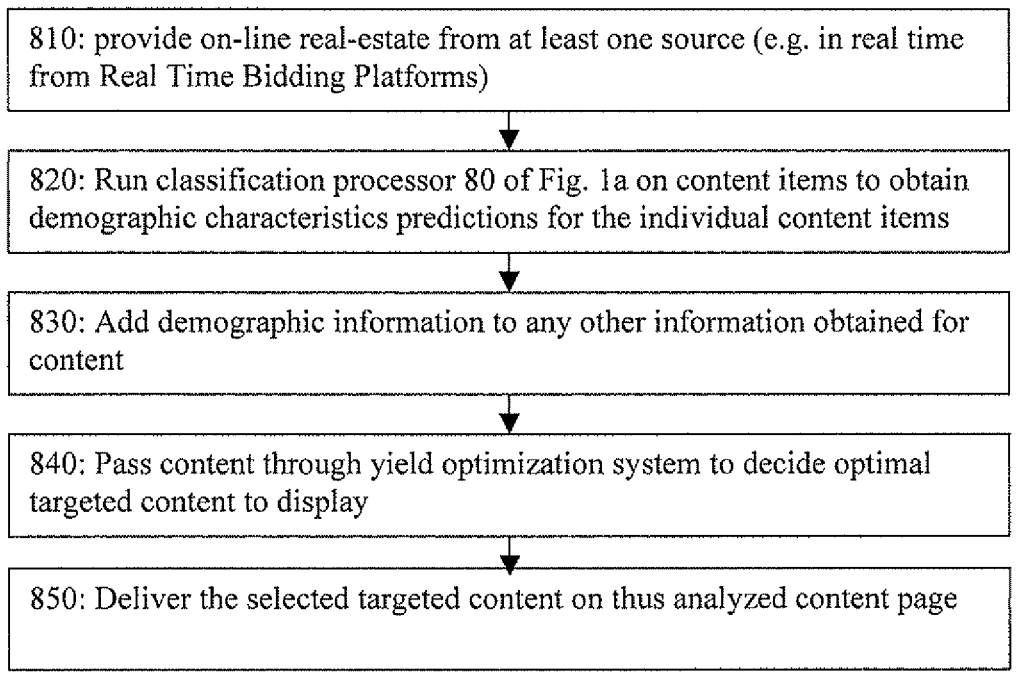
FIG. 7 is a simplified flowchart illustration of a method for enabling computerized bidding applications to tag web content, the method including some or all of the illustrated steps, suitably ordered e.g. as shown.

Certain embodiments of the system of the present invention, e.g. as shown in FIG. 7, enable computerized bidding applications to tag web content with demographic characteristics or other information thereby to allow users to make bidding and targeted content display decisions based upon the demographic characteristics or other information, optionally using a yield optimization engine such as that available from rubiconproject.com).

Figure 8:
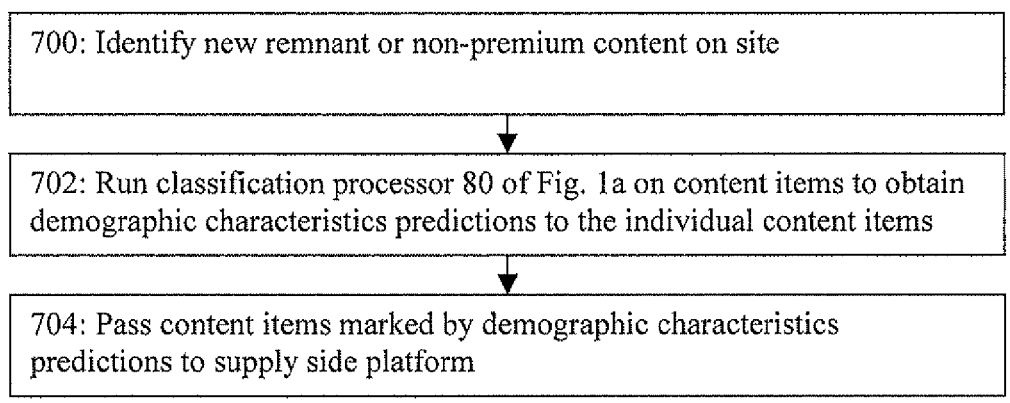
FIG. 8 is a simplified flowchart illustration of a method for using the system of FIG. 1a in a computerized supply side platform application, operative in accordance with certain embodiments of the present invention, which method includes some or all of the illustrated steps, suitably ordered e.g. as shown.
Figure 9:
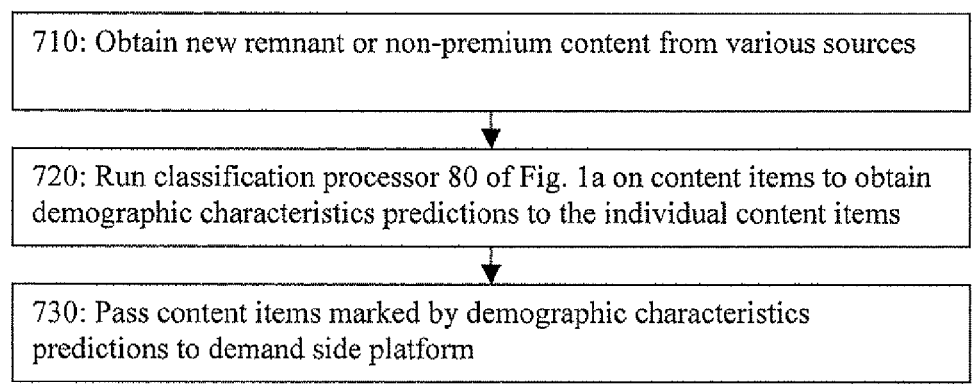
FIG. 9 is a simplified flowchart illustration of a method for using the system of FIG. 1a in a computerized demand side platform, operative in accordance with certain embodiments of the present invention, which method includes some or all of the illustrated steps, suitably ordered e.g. as shown.

Applications of certain embodiments of the present invention include supply side platform applications e.g. as described in FIG. 8 and demand side platform applications e.g. as described in FIG. 9, such as for distribution of remnant content from a plurality, typically, of sources of media real-estate such as computerized publishers, Ad networks or DSPs.

It is appreciated that the demographic information generated by the system of FIG. 1*a* is useful because it allows further direct computerized processing of such demographic information, by providing the demographic information directly to other software applications rather than having to manually provide external input to such other software applications. For example, as shown in FIG. 8, certain embodiments of the present invention enable providing content publishers a novel means to promote their content and leveraging this information as means in a supply side platform. And/or, as shown in FIG. 9, certain embodiments of the present invention also enable creating a demand side platform which offers targeted content providers a content reach defined by demographic characteristics.

A publisher application may run the method of FIG. 8 e.g. for each new content published. Frequency of doing so may vary between sites; a typical scenario may be once every few minutes for active sites built above the system of the present invention.

When dealing with a large continuous stream of input pages to classify (e.g. as in the example setting described in FIG. 9) the classification unit 80 may run continuously and have webpages passed to it as they arrive e.g. in real time.

Figure 12:
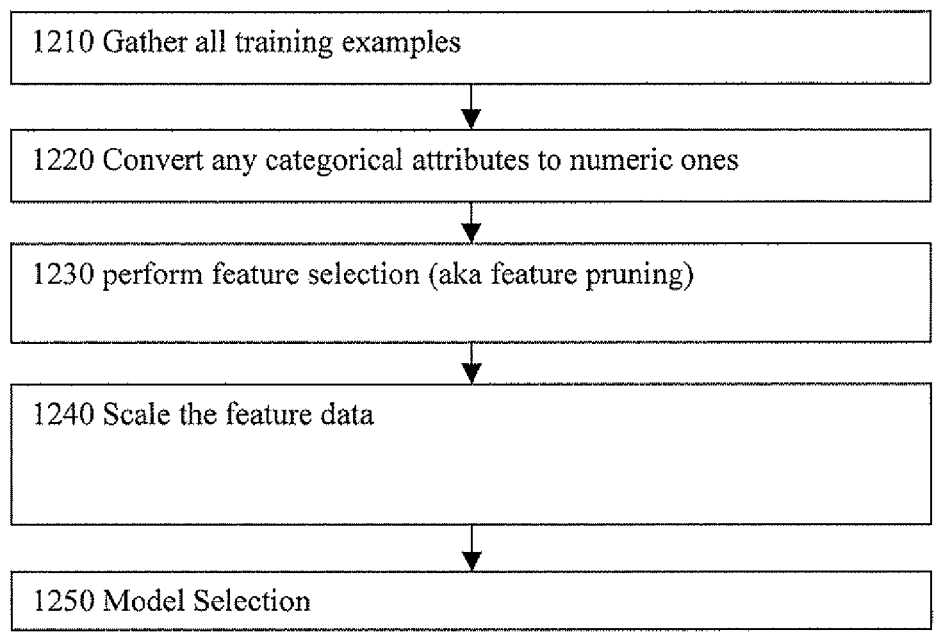
FIG. 12 is a simplified flowchart illustration of a method for passing content plus demographic information to the supervised learning algorithm, which may be useful in performing step 340 of FIG. 2.

FIG. 12 is a simplified flowchart illustration of a method for passing content plus demographic information to the supervised learning algorithm, which may be useful in performing step 340 of FIG. 2. More generally, any suitable method may be used to perform step 340, such as but not limited to any of the teachings of "A practical guide to SVM classification" by Chih-Wei Hsu, Chih-Chung Chang, and Chih-Jen Lin. available at the following http www location: csie.ntu.edu.tw/~cjlin/papers/guide/guide.pdf As described above, the method of FIG. 12 typically includes passing content items represented as features plus corresponding target demographic characteristics to a supervised learning algorithm in order to obtain a prediction model. The method of FIG. 2 typically includes some or all of the following steps, suitably ordered e.g. as shown. Typically, steps 1230 and 1250 are to be applied in learning state only. For simplicity and clarity, the method of FIG. 12 assumes a setting in which an SVM classifier such as svmLight or IibSVM is used, however this is not intended to be limiting. If a different classifier is used the method may be modified accordingly by an ordinarily skilled man of the art; for example, some decision tree classifiers may accept categorical attributes and thus step 1230 may be omitted.

The steps of FIG. 12 are now described in detail:

Step 1210: gather all training examples. All features are typically of the form of feature name+feature weight.

Step 1220: may be performed conventionally e.g. as per section 2.1 in the above-referenced "Practical guide to SVM classification"

Step 1230: Feature pruning (aka using conventional feature selection techniques) is performed typically prior to passing examples to the learning algorithm, e.g. as described at the following http location: jmlr.csail.mit.edu/papers/special/feature03.html, or at the following http www location: hpl.hp.com/techreports/2007/HPL-2007-16R1.pdf. Feature pruning is typically performed only in learning stage; during classification, attributes which are not present in model can be ignored.

Step 1240: The feature data is scaled. Data scaling typically involves changing the attribute weights. Scaling is typically performed to avoid attributes in greater numeric ranges dominating those in smaller numeric ranges. Attributes may be linearly scaled to the range [−1; +1] or [0; 1]. The following http www location: hpl.hp.com/techreports/2007/HPL-2007-32R1.pdf includes a description of a conventional scaling scheme for svm based text classification. The same method is used to scale both training (learning) and testing (classification) data.

Step 1250: Most classifiers have various parameters that may be configured. Though one can always run the classifier with the pre-set or default parameters, it is often the case that suitable modification of parameters results in a better model producing significantly better results. In LibSVM, for example, the kernel (e.g. linear or RBF) or the penalty parameter C, may be determined. To find the optimal model (set of parameters) a grid search may be performed on the parameters using cross-validation to obtain classification quality, all as is known in the art, e.g. as per section 3.2 in "A practical guide to SVM classification".

It is appreciated that any suitable computerized apparatus may be used to generate the prediction model for embodiments of the present invention, once training data is available. In particular, there many types of supervised classification algorithms known in the academic literature and/or implemented in practice and available, freely or commercially available, such as but not limited to the following types: naïve bayes, SVM, Maximum Entropy, decision tree, random forests, and meta classifiers.

Naïve Bayes-type prediction model generating technology is available e.g. as the WEKA package, e.g. at the following http www location: cs.waikato.ac.nz/~ml/weka/; and also as the NLTK package e.g. at the following http locations: nltk.googlecode.com/svn/trunk/doc/api/nltk-module.html, and nltk.googlecode.com/svn/trunk/doc/api/nltk.classify.naivebayes.NaiveBayesClassifier-class.html.

SVM-type prediction model generating technology is available e.g. as LibSVM or SVMLight.

Maximum Entropy-type prediction model generating technology (e.g. as described in "Using Maximum Entropy for Text Classification", Kamal Nigam et al, IJCAI 1999) is available from Princeton (Robert Schapire available e.g. at the following http www location: cs.princeton.edu/~schapire/maxent/); and as the OpenNLP package e.g. at the following http locations: opennlp.sourceforge.net/, and incubator.apache.org/opennlp/documentation/apidocs/opennlp-maxent/index.html.

Decision Trees-type prediction model generating technology is available, for example, as the WEKA implementation of J48 decision tree algorithm e.g. as per: weka.classifiers.trees.J48, or e.g. at the following http location: weka.sourceforge.net/doc/weka/classifiers/trees/j48/package-summary.html. Also available is CART 5.0 decision-tree software, distributed by salford-systems.com.

Random Forests-type prediction model generating technology is available from Apache Mahout—e.g. at the following https locations:

---
cwiki.apache.org/MAHOUT/mahout-wiki.html and
cwiki.apache.org/MAHOUT/random-forests.html.

---

Matlab code-type prediction model generating technology is available e.g. at the following http location: code.google.com/p/randomforest-matlab/. An example of a meta classifier that builds an ensemble from multiple classifiers is the WEKA package—MultipleClassifiersCombiner available e.g. at the following http www location: cs.waikato.ac.nz/~ml/weka/.

Thresholds used herein may be generated by using a conventional Learning system to generate an "optimal" model and using prediction values returned by the corresponding classifier (optionally with a confidence score) as thresholds.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMS. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A system for generating a demographic profile for a set of at least one webpage, the system comprising:
   a computer processor;
   a webpage audience information gatherer operative for providing, for at least one webpage, training data including demographic information characterizing an audience of the webpage; and
   a predictor developing module using the computer processor to compute at least one content characteristic of said webpage and to develop a prediction process which if applied to said content characteristic would have predicted said training data,
   wherein the prediction process is constructed and operative to be employed by an audience predicting processor operative, for at least one new webpage whose audience is unknown, to compute at least one content characteristic of the new webpage and to generate predicted demographic information predicted to characterize said unknown audience of said new webpage by applying said prediction process to said new webpage's content characteristic,
   wherein said audience information gatherer is operative for:
   identifying user profiles with explicit demographic characteristics stated in a profile page;
   adding these user profiles to a user panel; and
   monitoring data stream in social media platforms of users in panel;
   identifying posts referencing at least one web page; and
   adding web page URI with demographic characteristics of user to a training data repository.

2. A system according to claim 1 and also comprising a webpage audience predicting processor operative, for at least one new webpage whose audience is unknown, to compute at least one content characteristic of the new webpage and to generate predicted demographic information predicted to characterize said unknown audience of said new webpage by applying said prediction process to said new webpage's content characteristic.

3. A system according to claim 1 wherein said combining comprises averaging.

4. A system according to claim 1 wherein said demographic information characterizing an audience of the web page data is associated in computer memory with web page data comprising actual html content.

5. A system according to claim 1 wherein said demographic information characterizing an audience of the web page data is associated in computer memory with a uniform resource identifier identifying at least one webpage.

6. A system according to claim 1 wherein webpage audience information gatherer is run as a onetime process.

7. A system according to claim 1 wherein webpage audience information gatherer is run as a periodical batch job.

8. A system according to claim 1 wherein webpage audience information gatherer is run continuously, generating a continuous stream of input training data.

9. A system according to claim 1 wherein webpage audience information gatherer fetches demographic information characterizing an audience of the webpage from a supplier of demographic information characterizing webpage audiences.

10. A system according to claim 1 wherein webpage audience information gatherer fetches demographic information characterizing an audience of the webpage from click-stream data of a user-panel with known demographics.

11. A system according to claim 1 wherein webpage audience information gatherer provides demographic information characterizing an audience of the webpage by monitoring social media streams.

12. A system according to claim 11 wherein said webpage audience information gatherer utilizes information provided by social media platform users' public homepages on which at least one demographic characteristic is explicitly stated.

13. A system according to claim 1 and also comprising a feature extraction unit serving at least one of the predictor developing module and the webpage audience predicting processor.

14. A system according to claim 13 wherein said feature extraction unit is operative to extract at least one word from webpage textual content.

15. A system according to claim 14 wherein said feature extraction unit is operative to extract at least one stylistic writing feature.

16. A system according to claim 15 wherein said stylistic writing feature includes use of parts of speech.

17. A system according to claim 15 wherein said stylistic writing feature includes sentence length.

18. A system according to claim 14 wherein said feature extraction unit is operative to extract at least one html specific feature.

19. A system according to claim 14 wherein said feature extraction unit comprises a web content fetching tool.

20. A system according to claim 19 wherein said content fetching unit performs page cleaning to remove sections of pages which do not contain main content essence of the pages.

21. A system according to claim 14 wherein said feature extraction unit caches content thereby to enhance efficiency and/or reduce web traffic volume.

22. A system according to claim 14 wherein said feature extraction unit is operative to extract at least one design feature representing visual design aspects of content and derived from markup language.

23. A system according to claim 14 wherein said feature extraction unit is operative to extract at least one feature relating to a content identifier of a web page.

24. A system according to claim 14 wherein said feature extraction unit is operative to extract at least one feature relating to a content identifier of a web-site.

25. A system according to claim 14 wherein said feature extraction unit is operative to extract at least one feature from meta-data supplied with a web-page.

26. A system according to claim 14 wherein said feature extraction unit extracts at least one feature from information about a web-site obtained from a 3rd party provider.

27. A system according to claim 14 wherein said feature extraction unit extracts at least one feature from site information mined from the Internet.

28. A system according to claim 14 wherein said feature extraction unit extracts a typification of a website from an existing website categorization information repository.

29. A system according to claim 14 wherein said feature extraction unit extracts overall site demographic statistics obtained from a web-site demographic statistics information repository.

30. A system according to claim 1 wherein said webpage audience predicting processor includes a plurality of classifiers respectively trained for a plurality of types of features.

31. A system according to claim 30 wherein said prediction process includes a plurality of individual models for each of said plurality of types of features and wherein said classifiers apply said individual models respectively thereby to generate a plurality of outputs.

32. A system according to claim 31 wherein said plurality of outputs is combined by majority voting.

33. A system according to claim 1 wherein said webpage audience predicting processor is operative to perform a new webpage learning process including comparing output of said prediction process as applied to said new webpage, to new webpage audience information, if known, and updating the prediction process accordingly.

34. A system according to claim 1 wherein said webpage audience predicting processor is also operative to perform website-level processing including combining said demographic information over all pages in the site.

35. A system according to claim 1 wherein said audience information gatherer is operative to crawl user profile pages of social media.

36. A system according to claim 35 wherein extraction is customized by specifying where the user profile information is found on the page.

37. A system according to claim 1 wherein said audience information gatherer employs social media public APIs to provide user profile information in a structured format.

38. A system according to claim 37 wherein the audience information gatherer runs iteratively over users, by following suitable links, so as to obtain a larger set of different users.

39. A system according to claim 1 wherein said predictor developing module is operative for:
obtaining training data from the training data repository;
fetching any missing content;
passing individual content examples to a feature extraction unit which is operative to provide representative features of each training content item; and
using content items represented as features along with corresponding target demographic characteristics as input to a supervised learning process thereby to obtain a prediction model predicting demographic characteristics of a page audience, as a function of page features.

40. A system according to claim 39 wherein said obtaining training data includes obtaining available input from said training data repository and fetching any missing content.

41. A system according to claim 39 and wherein said fetching comprises calling a content fetcher and cleaning at least one page fetched thereby, leaving only a content section of the page.

42. A system according to claim 1 wherein said webpage audience predicting processor is operative for:
obtaining input content whose audience is unknown from an input data repository;
passing at least one individual content example to a feature extraction unit which is operative to provide representative features of each training content item; and
passing content items represented as features to a classifier which runs a prediction model and obtains demographic characteristic predictions.

43. A system according to claim 42 wherein, if multiple items from a single site were passed as input, the webpage audience predicting processor is operative for computing a central tendency of the individual content predictions to obtain site-level statistics.

44. A computer program product, comprising a non-transitory computer readable medium having a computer readable program code embodied therein, said computer readable program code adapted to be executed to implement a method for generating a demographic profile for a set of at least one webpage, the method comprising:

providing, for at least one webpage, training data including demographic information characterizing an audience of the webpage;

computing at least one content characteristic of said webpage and developing a prediction process which if applied to said content characteristic would have predicted said training data; and for at least one new webpage whose audience is unknown, computing at least one content characteristic of the new webpage and generating predicted demographic information predicted to characterize said unknown audience of said new webpage by applying said prediction process to said new webpage's content characteristic, wherein said providing comprises:

identifying user profiles with explicit demographic characteristics stated in a profile page;

adding these user profiles to a user panel; and monitoring data stream in social media platforms of users in panel;

identifying posts referencing at least one web page; and adding web page URI with demographic characteristics of user to a training data repository.

45. A method for generating a demographic profile for a set of at least one webpage, the method comprising:

computing, for at least one new webpage whose audience is unknown, at least one content characteristic of the new webpage and to generate predicted demographic information predicted to characterize said unknown audience of said new webpage by applying a prediction process to said new webpage's content characteristic, wherein the prediction process is characterized in that if applied to at least one content characteristic of a webpage whose audience's demographic information is known, said prediction process predicts training data including known demographic information characterizing an audience of the webpage, identifying user profiles with explicit demographic characteristics stated in a profile page;

adding these user profiles to a user panel;

monitoring data stream in social media platforms of users in panel;

identifying posts referencing at least one web page; and adding web page URI with demographic characteristics of user to a training data repository.

\* \* \* \* \*